United States Patent

Steiner

[15] 3,656,776
[45] Apr. 18, 1972

[54] SEMI-TRAILER
[72] Inventor: Helmut Steiner, Freiherr-vom-Stein-Strasse 1, 5284 Wiehl, Germany
[22] Filed: Nov. 28, 1969
[21] Appl. No.: 880,777

[30] Foreign Application Priority Data
Dec. 2, 1968 Germany.....................P 18 12 153.4

[52] U.S. Cl. .......................................................280/81 A
[51] Int. Cl..............................................................B62d 53/06
[58] Field of Search......................................280/81 A, 81 R

[56] References Cited

UNITED STATES PATENTS 2,690,916 10/1954 Gilliam................................280/81 A
3,381,974 5/1968 Carter, Jr. et al....................280/81 A
3,403,925 10/1968 Sauer...................................280/81 A

FOREIGN PATENTS OR APPLICATIONS 163,521 6/1954 Sweden...............................280/81 A Primary Examiner—Benjamin Hersh
Assistant Examiner—Robert R. Song
Attorney—Walter Becker

[57] ABSTRACT

A semi-trailer which has at least one track alignment axle pivotally movable about the vertical central axis of said axle, which latter has associated therewith locking means operable positively to prevent said axle from pivoting about said axis when said semi-trailer is moving along a substantially straight path.

3 Claims, 4 Drawing Figures

INVENTOR.
Helmut Steiner
BY 3,656,776

SEMI-TRAILER

This invention relates to a semi-trailer of the type having at least one track alignment axle with a pivot mounting or one track alignment steering axle.

Semi-trailers having for example, one rigid axle and on supporting track alignment axle with a pivot mounting or one track alignment steering axle are known. The track alignment axle or track alignment steering axle gives various advantages to this type of semi-trailer, for example a better curve negotiating characteristic and a lower wear and tear of the tires. With the track alignment axle or the track alignment steering axle, however, some disadvantages result with regard to the lateral guidance of the vehicle, for example, when the vehicle runs straight and shimmying or rolling movements occur which are caused by one-sidedly passing through obstacles or by skew running or corrugated road surfaces or one-sided braking.

The primary object of the invention is to prevent or minimize the foregoing shimmying and rolling movements and the skew run of semi-trailers having a track alignment axle or a track alignment steering axle.

This object and other objects and advantages of the invention will appear more clearly from the following specification, in connection with the accompanying drawings, in which.

According to the invention a semi-trailer having at least one tract alignment axle with pivot mounting or one track alignment steering axle is characterized in that the track alignment axle or track alignment steering axle is adapted to be secured or arrested as to its position by a steering lock when the vehicle is running straight forward.

According to a further development of the invention, the steering lock is releasable by means of a switch contact arranged on the supporting member for the tractor, which is put into operation only by a movement between tractor and semi-trailer. For this purpose the switch contact may consist of a pressure switch arranged on the frame of the semi-trailer and shaped plates arranged on the frame or on the supporting member of the tractor. It may also be expedient to place a switch in the driver's cab of the tractor, by which it is possible to secure the steering lock independently of the deflexion of the steering mechanism.

Figure 1:
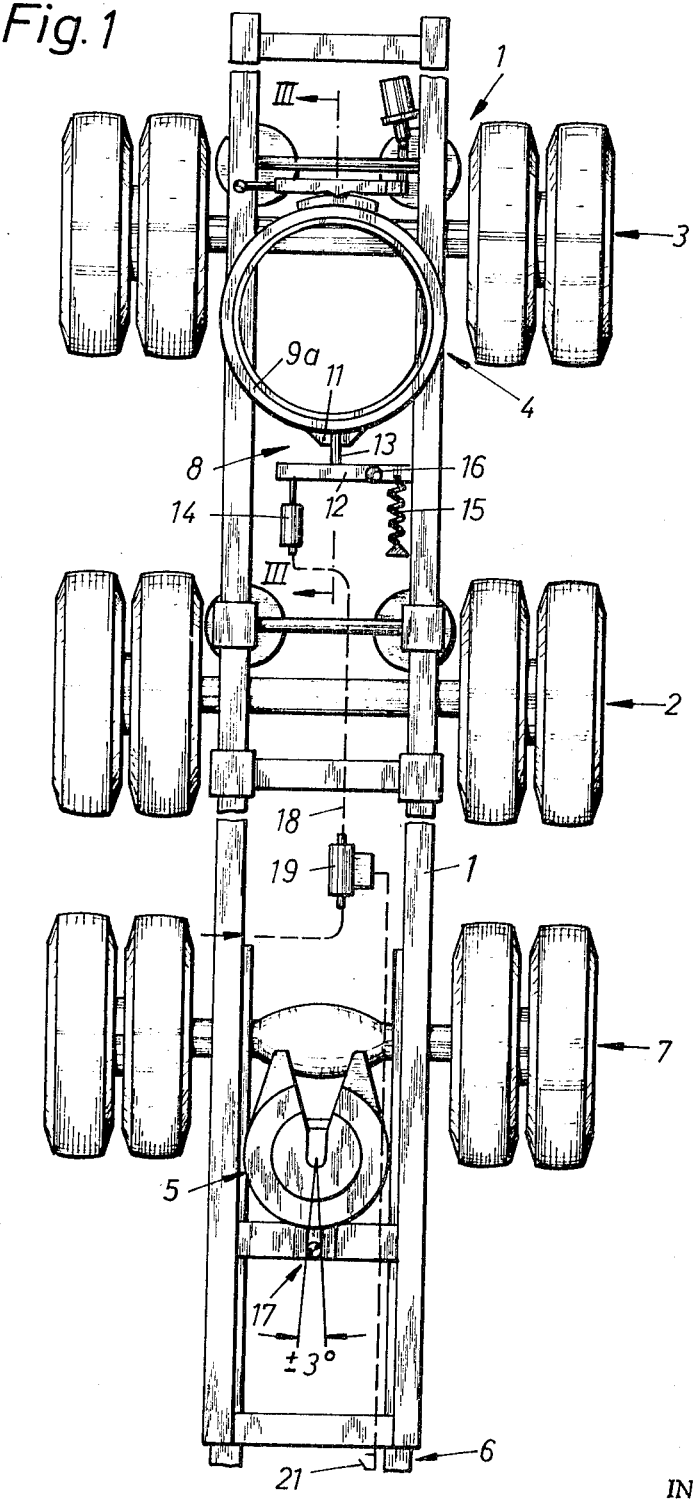
FIG. 1 shows a semi-trailer with a part of the tractor without superstructure in plan view.
Figure 2:
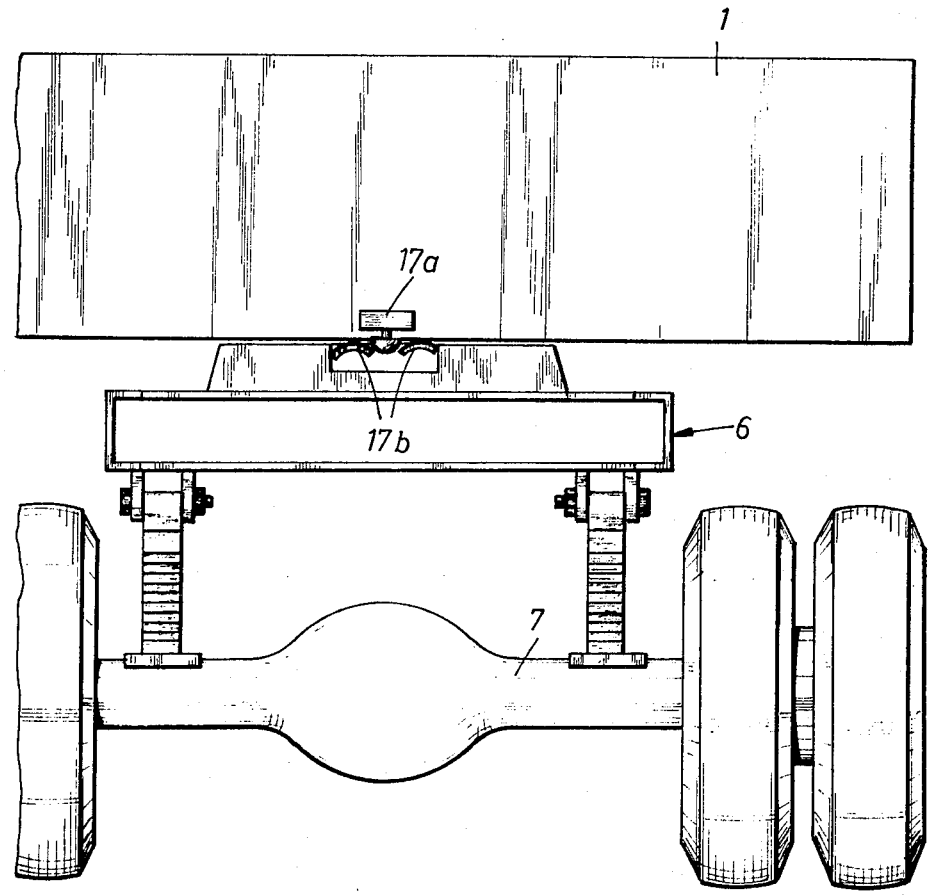
FIG. 2 shows the same semi-trailer seen from the front.
Figure 3:
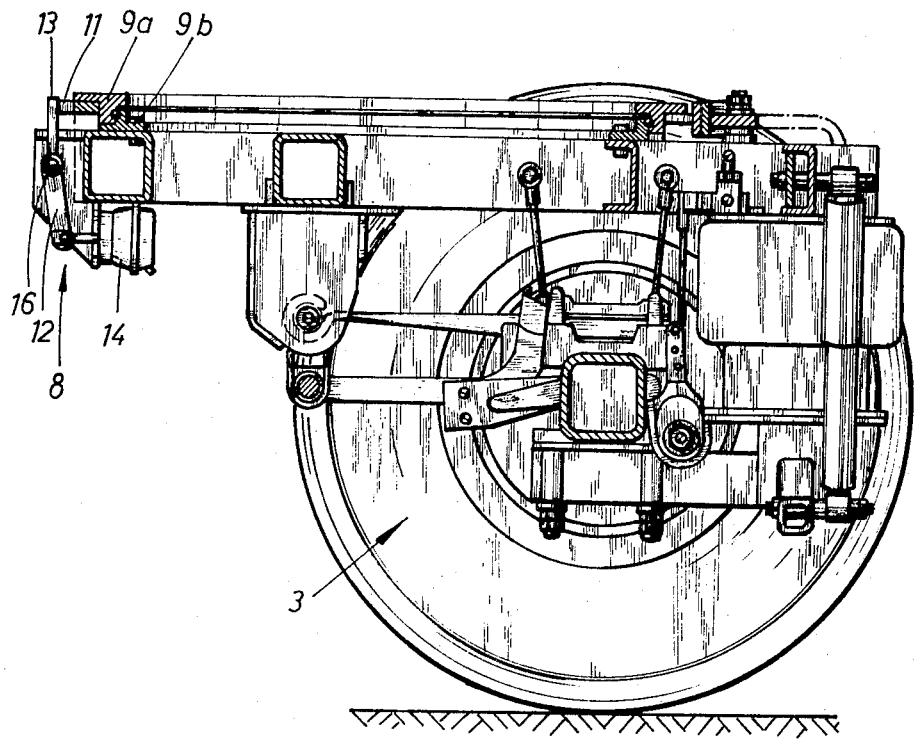
FIG. 3 shows a track alignment axle along the line III—III in FIG. 1 illustrated in enlarged cross-section.

The semi-trailer shown in FIGS. 1 and 2 consists of a frame 1 with a supporting rigid axle 2, a track alignment axle 3, under which a pivot mounting 4 is constructed, and a supporting member 5. The semi-trailer is coupled to an only partly shown tractor 6 with a driving axle 7, by means of the supporting member 5.

The track alignment axle 3 can be secured in its position in straight-on run by means of a steering lock 8. This steering lock 8 consists, in principle, of a locking plate 11 fixed on the upper turn-table ring 9a of the pivot mounting 4, and of a wedge-formed part 13 which is articulated and which can be moved by a lever 12. According to the control system shown in FIG. 1, the wedge-formed part 13 can be released about a pivot 16 by means of a compressed-air cylinder 14 against the action of a return spring 15. The compressed air cylinder 14 is put into operation by a switch contact 17 placed on the supporting member 5, which consists of a pressure switch 17a (FIG. 2) fixed on the frame 1 of the semi-trailer and of shaped plates 17b arranged on the frame of the tractor 6. The two shaped plates 17b are arranged in such a distance from the pressure switch that the steering lock is operated only at a predetermined deflexion of the supporting member 5 of plus minus 3°. For this purpose the switch contact 17 opens or closes a valve 19 arranged in a compressed-air line 18 and relieves the steering lock. The steering lock 8 may also be operated by means of a switch 21 placed in the driver's cab of the tractor when shunting of the vehicle is required.

Figure 4:
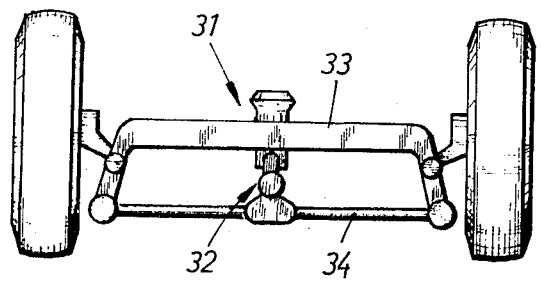
FIG. 4 shows a track alignment steering axle viewed from the top.

The control system shown in FIGS. 1 and 2, may also be applied accordingly if, instead of the track alignment axle 3, the track alignment steering axle 31 shown in FIG. 4, is placed under the frame 1, of the semi-trailer. With this type of axle, a steering lock 32 between one body of the axle 33 and one track rod 34 is provided, which corresponds in function and method of action approximately to the steering lock 8.

It is, of course, to be understood that the present invention is not limited to the particular showing in the drawing, but also comprises any modification within the scope of the appended claims.

What I claim is:

1. A semi-trailer having at least one track alignment axle with means permitting a pivotal movement of said axle about the vertical central axis of said axle, which includes locking means operable positively to prevent said axle from pivoting about said axis when said semi-trailer is moving along a substantially straight path, said locking means including an upper turn-table ring having a locking plate secured directly thereon and a lower turn-table ring having a movable lever linked therewith as well as carrying a wedge piece also linked to said lever, fluid actuated cylinder means operative upon said lever engageable with said locking plate, supporting means of the semi-trailer for resting on a tractor, and control switch means at least in part arranged fixedly with two plate members on said supporting means of the semi-trailer and operatively connected to said locking means, said control switch means being operable upon engagement with one of said plate members in response to the longitudinal central axis of said semi-trailer forming with the longitudinal axis of a tractor therefor an angle exceeding a predetermined maximum angle to make said locking means ineffective.

2. A semi-trailer according to claim 1, in which said control switch means comprises a pressure switch mounted on a frame structure forming part of said semi-trailer, and two terminals formed by said plate members arranged in spaced relationship to each other and located laterally of said pressure switch for actuation thereby.

3. A semi-trailer according to claim 2, which includes manually operable means adapted operatively to be connected to the driver's cab of a tractor for said semi-trailer, and operable independently of said control switch means for controlling said locking means whenever desired.

* * * * *